Patented Oct. 22, 1946

2,409,809

UNITED STATES PATENT OFFICE 2,409,809

CURING BUTADIENE-STYRENE SYNTHETIC RUBBER

Lawrence R. Sperberg, Bartlesville, Okla., assignor to Phillips Petroleum Company, a corporation of Delaware No Drawing. Application December 11, 1943, Serial No. 513,989

3 Claims. (Cl. 260—79)

This invention relates to the production of butadiene-styrene synthetic rubber of improved properties and more particularly to an improved process of curing butadiene-styrene synthetic rubber stocks such as tread stocks.

The principal object of the present invention is to provide an improved process of curing butadiene-styrene synthetic rubber stocks. Another object is to provide such a process which produces cured stocks having markedly improved properties. Another object is to provide a curing process of the foregoing type which greatly increases the production capacity of given molding equipment by greatly decreasing the length of time in the mold. Another object is to provide a process of the foregoing type which accomplishes extensive reduction in the time in the mold without the disadvantages of conventional curing processes wherein large amounts of accelerator and sulfur are used in order to enable curing in a very short time with deleterious effect upon the properties of the product. Another object is to provide such a curing process which enables the use of lower amounts of both accelerator and sulfur in the formulation. Another object is to make an improved product of the foregoing type at lower cost by reason of the lessened amount of accelerator required and the increase in productive capacity for a given investment in plant and labor. Numerous other objects will hereinafter appear.

Conventional practice in the curing of butadiene-styrene synthetic rubber involves using in the formulation large amounts of sulfur and accelerator in order to produce rapid cure and curing in the mold as rapidly as possible to release the mold for further use. Since the entire cure is completed in the mold it is the practice to use fast-curing formulations in order to increase the productive capacity of given molding equipment. The sulfur and accelerator content of the crude stock are correlated to the short curing time which is employed.

I have now found that greatly improved butadiene-styrene rubber articles are produced by substantially reducing the amount of sulfur and accelerator used in a given butadiene-styrene rubber formulation and substantially increasing the curing time over that which would be employed in conventional practice for a corresponding formulation having the conventional content of sulfur and accelerator. Thus my invention involves preparing a crude butadiene-styrene synthetic rubber stock having a content of sulfur and accelerator substantially less than that conventionally used in a corresponding formulation having the conventional content of sulfur and accelerator, and curing said crude stock for a period of time which is substantially longer than conventional for such a corresponding formulation and which is sufficient to completely cure said stock. Butadiene-styrene synthetic rubber articles made in this manner exhibit improved properties over those made by present practices. In particular they display improved resistance to accelerated aging in a circulating air oven at 100 C., wherefore they undergo minimum increases in modulus, hardness, and resilience, and minimum decreases in flex life, tensile strength, hysteresis, elongation, and resistance to abrasion.

In the practice of the invention the crude stock is often prepared with a content of sulfur and accelerator so much less than that conventionally used in a corresponding formulation identical except in content of sulfur and accelerator that the time required for complete curing of the stock is at least 2.5 times the time for complete curing of said corresponding formulation at the same temperature, and the resulting stock is then completely cured. Even better results are obtained when the sulfur and accelerator content of the stock is so low as to require for complete curing at least five times the time required for complete curing of a corresponding conventional formulation having the usual content of sulfur and accelerator and otherwise identical under the same curing conditions.

The present invention, by providing a crude butadiene-styrene stock which is slow-curing and completely curing this stock over a long period of time, yields a cured product which when subjected to conventional accelerated aging exhibits physical properties which equal or even surpass those of the original cured product. While moderate reductions in sulfur and accelerator content of the crude stock and concomitant moderate increases in time of cure of the crude stock so prepared yield a product which upon aging displays physical properties approximating or slightly exceeding those of the unaged cured product, I have found that the extension of this principle to even greater reductions in sulfur and accelerator content with attendant greatly increased times of cure produces a product which upon aging shows physical properties greatly superior to those of the original unaged product.

The curing may be completed in the mold. However in the preferred practice of the invention, the crude butadiene-styrene rubber stock is cured in the mold for a relatively short period of time at least sufficient, and preferably sufficient only, to set the material so that it will retain its shape during the remainder of the treatment, is then removed from the mold, and is further cured outside the mold by subjecting to a suitable curing temperature for a period of time sufficient to complete a thorough cure.

The cure outside the mold may be conducted at the same or substantially the same temperature as that employed in the setting in the mold or at a materially lower temperature in which case proportionately longer time is required or at a substantially higher temperature than the temperature maintained in the mold. The use of lower temperatures is preferred. As will be obvious to those skilled in the art, the temperature used in this portion of the curing operation must be sufficiently high to effect the curing. Those skilled in the art will be readily able to correlate curing time and temperature. Thus the principles whereby the curing time at a specified temperature can be determined from the curing time at a different temperature level are already known in the art of curing butadiene-styrene stocks.

A non-oxidizing atmosphere in the curing outside the mold is preferred since detrimental oxidation of the rubber can not take place in such an atmosphere. The importance of using a non-oxidizing atmosphere in this portion of the curing operation depends to a large extent upon the temperature employed and the consequent length of this curing step. At the lower curing temperatures with consequent relatively long times of cure it is important to use a non-oxidizing atmosphere while at high curing temperatures with shorter curing times the type of atmosphere is less important since the time of cure is so short that even in an oxidizing atmosphere the rubber is often not objectionably injured by the oxidizing nature of the surrounding atmosphere.

A typical mode of effecting the cure outside the mold is to place the molded articles in a chamber heated to and maintained at the desired curing temperature. The articles may be allowed to remain stationary in such a chamber or may be transported therethrough by any suitable means as a conveyor. The articles are held in this heated chamber for the requisite curing time and are then removed and are ready for use.

The present invention is particularly applicable to the production of butadiene-styrene synthetic tires since use of the invention yields a finished tire which withstands road hazards much better than present butadiene-styrene rubber tires. The invention finds its widest application in the production of butadiene-styrene rubber tires which are under present practice cured for periods of time ranging up to 2 hours which periods are short judged by the standards of the present invention. This field takes in practically the entire butadiene-styrene synthetic tire industry.

My invention may be typified by the following example of its application to a common butadiene-styrene synthetic tire, namely, the 6.00—16 size. Conventional practice for that size of tire is to make a formulation so composed as to have a curing time of about 55 minutes at 280 F. and to cure at that temperature for that period of time. In accordance with my invention, I modify the conventional formulation of such a tire by so reducing the content of sulfur and accelerator that the curing time at 280 F. is extended to 75 minutes and cure the resulting tire for a total curing time of 75 minutes at 280 F. or an equivalent curing time at a higher or lower temperature as determined from known tables for equating times of cure at different temperature levels. This total curing time may be entirely in the mold although as explained above the time in the mold may be only sufficient to give the tire "set," say 20 minutes at 280 F., whereupon the tire is removed from the mold and the cure completed outside the mold, say by heating for 55 minutes at 280 F. or by heating in a non-oxidizing atmosphere at a materially lower temperature for a correspondingly longer time, say 229 minutes at 240 F. By the use of appropriate and still lower temperatures in the curing outside the mold, this curing step may be extended much further with still better effects on the properties of the product upon aging. In many cases the curing outside the mold may be for as long as 24 hours, 48 hours, a week, a month or even longer. It will be understood that the batch is formulated with reference to the particular long curing time to be applied.

In the light of the foregoing statement with specific reference to a particular size of tire, those skilled in the art will be readily able to apply my invention to any size and type of tire.

The preferred practice in accordance with the present invention is to cure in the mold at temperatures in the conventional range say at 260 to 300 F. for a period of time sufficient only to impart "set" to the tire, to then remove from the mold and complete the cure by heating in a non-oxidizing atmosphere for a long period of time say 48 hours at 212 F., 8 days at 184 F. or 16 days at 170 F. which time is proportionately longer and sufficient to complete the cure.

The present invention is based upon work performed on tread stock formulations with varied amounts of accelerator for a series of sulfur levels in the course of which it has been unexpectedly found that stocks which would be considered overcured from a conventional viewpoint exhibit improved physical properties in every respect upon testing by accelerated aging in a circulating air oven at 212 F. than do the same stocks when cured for the relatively short period of time characteristic of present-day common practice. In typical instances the resistance to cut upon accelerated aging actually improves for 75- and 150-minute curing times to large values such as 20,000 to 50,000 flexures to failure, whereas for 30- and 45-minute cures it drops from very high original or pre-aging values to such low values as 1000 to 10,000 flexures to failure. This demonstrates that by curing for long periods of time the present invention greatly improves the physical properties upon accelerated aging even though the original or pre-aging properties are at a maximum when short curing times are employed. This is shown more specifically by the following table of examples.

The formulation used in the examples was GRS (butadiene-styrene synthetic rubber) 100 parts; zinc oxide 3.0 parts; pine tar 4.0 parts; Bardol B 4.0 parts; carbon black (as indicated in the table) 45 parts; and parts of sulfur and accelerator as indicated in the table. As is known in the art "Bardol B" is the trade name of a coal tar oil which is a softener for synthetic rubbers.

| Example No. | Black | Accelerator | Parts/100 GRS | | Cure at 280 F., min. | Flex life flexures to failure | | Original tensile, lb./sq. in. |
|---|---|---|---|---|---|---|---|---|
| | | | Sulfur | Accelerator | | Original | Aged 48 hrs. at 212° F. in circulating air oven | |
| 1 | "Easy processing channel" | "Santocure" | 0.5 | 4.25 | 30 | 30,000 | 11,000 | 2,050 |
| | | | | | 45 | 29,200 | 14,700 | 2,390 |
| | | | | | 75 | 25,000 | 23,800 | 2,300 |
| | | | | | 150 | 19,600 | 32,500 | 2,380 |
| 2 | do | do | 0.5 | 8.00 | 30 | 9,800 | 6,600 | 2,610 |
| | | | | | 45 | 12,700 | 10,600 | 2,370 |
| | | | | | 75 | 8,000 | 12,800 | 2,460 |
| | | | | | 150 | 9,600 | 15,800 | 2,640 |
| 3 | "High modulus furnace" | do | 0.5 | 3.50 | 30 | 52,000 | 4,500 | 1,640 |
| | | | | | 45 | 44,500 | 7,600 | 1,740 |
| | | | | | 75 | 42,000 | 19,600 | 1,850 |
| | | | | | 150 | 34,500 | 45,400 | 1,900 |
| 4 | do | do | 0.5 | 5.00 | 30 | 24,600 | 1,200 | 1,740 |
| | | | | | 45 | 17,900 | 4,400 | 1,620 |
| | | | | | 75 | 20,500 | 10,900 | 1,670 |
| | | | | | 150 | 16,400 | 28,500 | 1,740 |

It will be seen upon inspection of the above table that in each example the flex life of the aged stock is at a maximum for the 150-minute cure even though the flex life of the original or unaged stock is at a minimum for this curing time with the exception of Example 2 where the original minimum was for the 75-minute cure. For instance in Example 1 the original flex life decreased from a maximum of 30,000 for the 30-minute cure to a minimum of 19,600 for the 150-minute cure while the aged material increased from 11,000 for the 30-minute cure to 32,500 for the 150-minute cure. A similar unexpected result is to be found in each of the other examples. The examples further show that in the case of samples alike in every other respect except in concentration of accelerator those of lower accelerator content display superior properties. This is seen by comparing the values in Example 1 with the corresponding ones in Example 2 and those in Example 3 with the corresponding values in Example 4.

From the foregoing it will be seen that the present invention presents the anomaly that the aged article or tire produced thereby displays better physical properties than the original article. In other words the article or tire actually gets better in service. This is brought out by comparing the flex life of the 150-minute cure of the aged article with the unaged in each example and of the 75-minute cure in Example 2. This is to be contrasted with GRS rubber articles made by conventional methods which deteriorate from the moment they are manufactured or put in service.

The examples given have only one sulfur level, namely, 0.5 part. The improved results of the present invention are particularly noted at low sulfur levels, namely not over 0.75 part of sulfur per 100 parts of GRS and are most pronounced at a sulfur level of 0.5 part. However, it is to be understood that similar results are obtained at all sulfur levels which would be employed in carrying out the present invention. Sulfur levels from 0.5 to 4.0 parts have been tested by applicant and found to yield a similar improvement. Similarly, while the examples show only flex life, the same results have been obtained for every other physical property tested including tensile strength, hysteresis, resilience, modulus, hardness, elongation, and resistance to abrasion. Again, while the examples show specific accelerator contents and specific formulations, the invention is not limited thereto but is applicable broadly.

While "Santocure" is used as the accelerator in the illustrative formulations given herein, the invention is not limited to use of this accelerator. As is well known "Santocure" is the condensation product of mercaptobenzothiazole with cyclohexylamine.

Preferred formulations in accordance with the present invention contain not over 0.75 part of sulfur and preferably 0.5 part of sulfur per 100 parts of GRS. They have a curing time by conventional standards of from 30 to 120 minutes at 280 F., i. e., develop optimum original properties under these curing conditions. In accordance with this invention they are cured for a substantially longer period of time which may range from 75 minutes at 280 F. for the 30-minute material to 300 minutes for the 120-minute material.

In accordance with the preferred practice of the present invention the advantages of the curing action between 30 and 150 minutes curing time (or between any definite short and long cure) are obtained by heat aging outside the mold preferably in a non-oxidizing atmosphere at temperatures of from 167 to 311 F. thereby duplicating the long-cure type of vulcanization taking place in a curing mold. This type of aging has the great advantage that only a short time is required in the mold, i. e., only the time required to give the "tire" set. This aging is preferably effected in a long enclosed conveying system or closed room containing a non-oxidizing atmosphere until the equivalent of the longer cure is obtained.

The advantages of the present invention are numerous. Tires made in accordance therewith give much better service, especially with regard to chipping, cracking, and cut growth. The present invention gives a product which is more stable and better able to withstand the effects of aging. The invention also gives a flatter non-persistent type of cure which is generally desirable. The invention is also advantageous because it enables the use of substantially reduced proportions of accelerator, thereby lowering the cost.

Since the invention may be practiced otherwise than as specifically described or illustrated, and since many modifications and variations of it will be obvious to those skilled in the art, it should be limited only in accordance with the appended claims.

I claim:

1. The process of making cured butadiene-styrene synthetic rubber stocks which comprises compounding a raw stock having the following formulation:

| | Parts by weight |
|---|---|
| Raw butadiene-styrene synthetic rubber | 100.0 |
| Zinc oxide | 3.0 |
| Pine tar | 4.0 |
| Coal tar oil softener | 4.0 |
| Carbon black | 45.0 |
| Sulfur | 0.5 |
| Condensation product of mercaptobenzothiazole with cyclohexylamine | 3.5 | and curing said stock for a period of time equivalent to 150 minutes at 280 F.

2. The process of making cured butadiene-styrene synthetic rubber articles exhibiting superior properties upon aging which comprises forming said article from a composition comprising raw butadiene-styrene synthetic rubber, carbon black, from 0.5 to 0.75 part of sulfur per 100 parts of said raw butadiene-styrene synthetic rubber, and an accelerator is amount sufficient to permit development of maximum flex life before aging in a curing time substantially equivalent to 30 minutes at 280 F., and curing said article for a period of time equivalent to at least 75 minutes at 280 F., the flex life before aging thereby being markedly reduced but the flex life on accelerated aging being markedly increased.

3. The process of making cured butadiene-styrene synthetic rubber articles exhibiting superior properties upon aging which comprises forming said article from a composition comprising raw butadiene-styrene synthetic rubber, carbon black, 0.5 part of sulfur per 100 parts of said raw butadiene-styrene synthetic rubber, and an accelerator in an amount sufficient to permit development of maximum flex life before aging in a curing time substantially equivalent to 30 minutes at 280 F., and curing said article for a period of time equivalent to at least 150 minutes at 280 F., the flex life before aging thereby being markedly reduced but the flex life on accelerated aging being markedly increased.

LAWRENCE R. SPERBERG.